E. A. LINDQUIST.
AUTOMATIC FEED AND RETURN MECHANISM FOR MACHINERY.
APPLICATION FILED JULY 8, 1914.

1,202,297.

Patented Oct. 24, 1916.
2 SHEETS—SHEET 1.

WITNESSES:

INVENTOR.
Eric A. Lindquist.
BY
HIS ATTORNEY.

E. A. LINDQUIST.
AUTOMATIC FEED AND RETURN MECHANISM FOR MACHINERY.
APPLICATION FILED JULY 8, 1914.
1,202,297.
Patented Oct. 24, 1916.
2 SHEETS—SHEET 2.
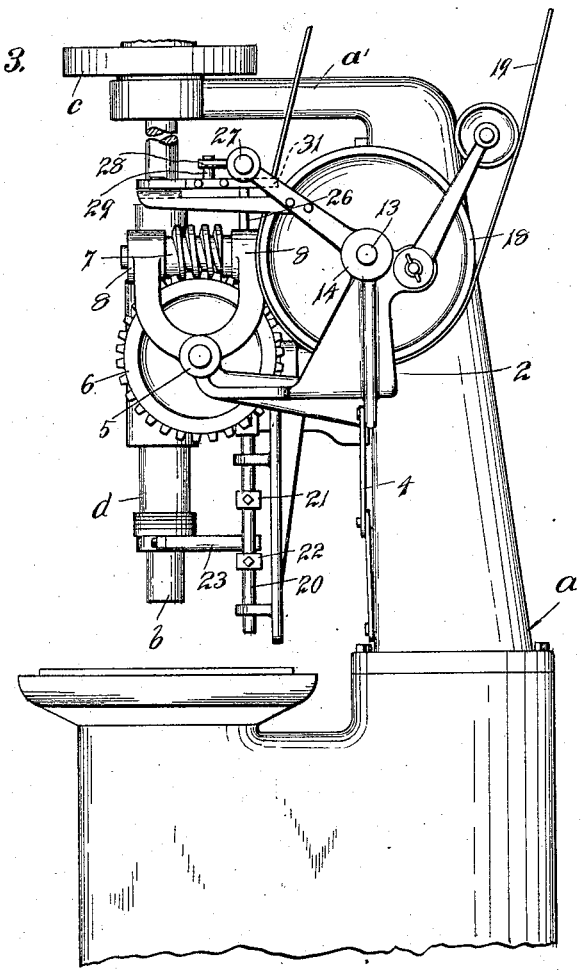
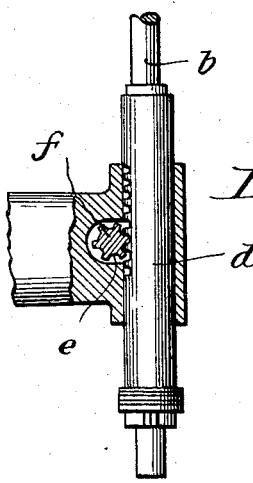
WITNESSES:
INVENTOR.
Eric A. Lindquist.
BY
HIS ATTORNEY.

UNITED STATES PATENT OFFICE.

ERIC A. LINDQUIST, OF MIDDLETOWN, CONNECTICUT, ASSIGNOR TO W. & B. DOUGLAS, OF MIDDLETOWN, CONNECTICUT, A CORPORATION OF CONNECTICUT.

AUTOMATIC FEED AND RETURN MECHANISM FOR MACHINERY.

1,202,297. Specification of Letters Patent. Patented Oct. 24, 1916.

Application filed July 8, 1914. Serial No. 849,698.

*To all whom it may concern:*

Be it known that I, ERIC A. LINDQUIST, a citizen of the United States, and a resident of Middletown, in the county of Middlesex and State of Connecticut, have invented certain new and useful Improvements in Automatic Feed and Return Mechanism for Machinery, of which the following is a specification.

The object of this invention is to provide an efficient and novel mechanism operating automatically, to feed a tool to the work upon which it is to operate and to return it to starting position after the work has been completed, and to continue these operations automatically while the machine is running.

The invention as illustrated is embodied in a drilling machine. It is obvious that mere reversal of the moving parts, that is to say, the work and the tool, could be accomplished by like or similar mechanism.

Figure 1:
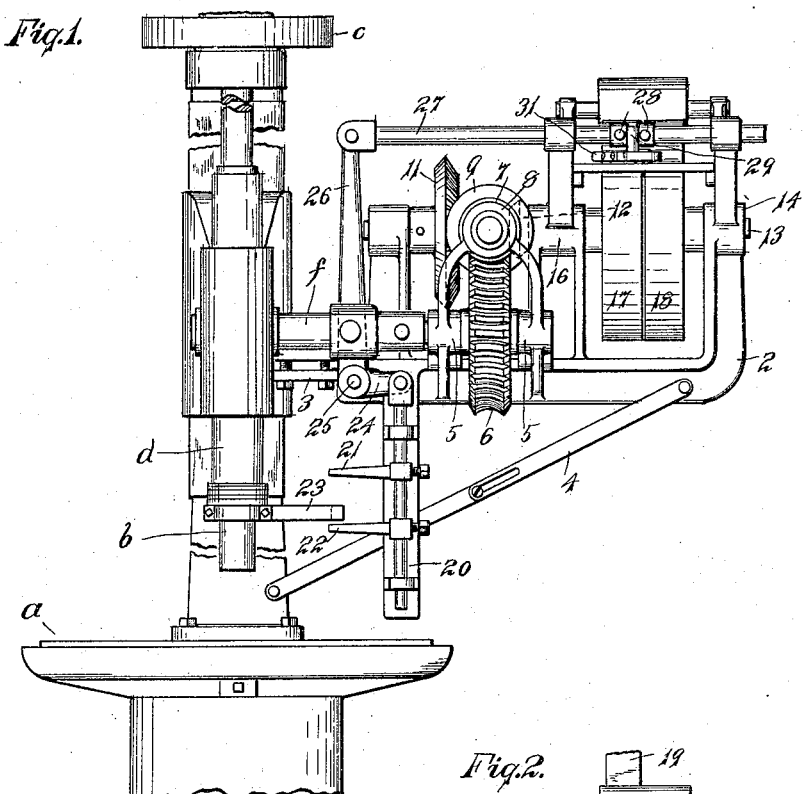
Figure 2:
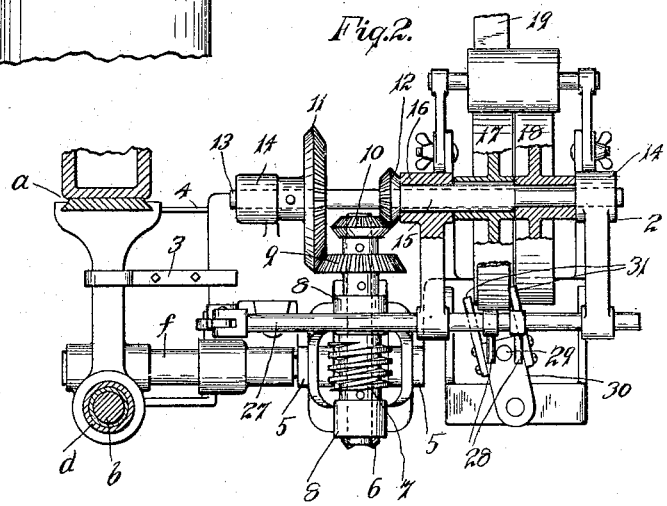

In the drawings—Figure 1 is a front view of a machine embodying my invention. Fig. 2 is a top view thereof, with parts broken away to show construction. Fig. 3 is a side view. Fig. 4 is a detail sectional view of a portion of the device illustrating the rack and pinion.

Referring to the drawings, *a* denotes in general the machine frame, and *b* the vertically reciprocating spindle suitably supported in the overhanging arm *a'* and driven by the pulley *c*. The spindle has the usual sleeve *d* with a rack cut at the rear to mesh with the pinion *e* carried on the shaft *f*, the rotation of the shaft either by hand or other means in one direction feeding the spindle down to the work, and in the other direction raising it away from the work.

The mechanism which constitutes the subject matter of this invention provides for automatically turning this shaft *f* to accomplish the feeding and returning motions of the spindle. This mechanism is supported in a frame 2 connected with the machine frame *a* by the bracket 3 and supported by the brace 4, or any other and suitable support for this frame 2 may be provided. This frame has bearings 5, 5, for an extension from the shaft *f*, and upon this shaft extension between the bearings is mounted a worm wheel 6 which meshes with a worm pinion 7 supported in bearings 8, 8, on the frame, this pinion shaft carrying at its end a pair of bevel gears 9, 10, of different diameters, one of which (9) meshes with a bevel gear 11 at one side, and the other gear (10) meshes with a bevel gear 12 at its opposite side. The gear 11 is mounted on the shaft 13 which is supported in bearings 14 on the frame 2. The gear 12 is mounted on a sleeve 15 which is rotatable on the shaft 13 and supported in a bearing 16. To the opposite end of the sleeve 15 from the gear 12 is secured a pulley 17, and to the shaft 13 is secured a pulley 18. 19 is the driving belt for these pulleys 17, 18, which is adapted to be shifted from one to the other. It will be noted that when the belt is on the pulley 17, as shown in Fig. 2, the bevel gear 12 will drive the bevel gear 10, rotating the shaft of the worm pinion 7 in one direction, and consequently through the worm wheel 6, shaft *f*, and pinion *e*, moves the spindle vertically in one direction, while if the belt be on the pulley 18 it will drive the shaft 13, and through the bevel gears 11, 9, worm pinion 7, worm wheel 6, shaft *f*, and pinion *e*, will move the spindle vertically in the opposite direction.

The shift mechanism for the belt is clearly shown in the drawings, and particularly in Figs. 1 and 2, and comprises a vertically moving trip rod 20 to which are secured trip arms 21, 22, between which works a tripper 23 secured to the spindle. The upper end of the trip rod 20 is secured to the short arm 24 of a bell crank lever pivoted at 25, to the long arm 26 of which is secured a shipper rod 27 from which project spaced pins 28, between which there is located a stud 29 on the shipper 30 whose arms 31 embrace the belt.

As the spindle moves down the tripper 23 strikes the trip arm 22, moving the trip rod 20 down and rocking the long arm 26 of the bell crank lever to the right, as seen from the front of the machine in Fig. 1, moving the shipper rod 27 to the right, and causing the shipper 30 to move the belt from the pulley 17 onto the pulley 18, which causes the rotation of the shaft 13, and, as stated above, the vertical movement of the spindle, which as the parts are shown would occasion the raising of the spindle. As soon as the spindle reaches its upper position the tripper 23 strikes the trip arm 21 on the trip rod 20, and through the bell crank lever, shipper rod and shipper, moves the belt back onto the pulley 17, which through the sleeve 15 and the above described connections causes the downward movement of the spindle.

There is thus provided an automatic mechanical feed and return for the spindle which is a continuously-acting mechanism, and is especially useful in the case of heavy drilling for instance where large drills and deep holes are to be cut, since it relieves the workman from the labor of feeding his drill through the work manually.

I claim as my invention:

1. In a machine of the character described, the combination with a member adapted for reciprocatory movement, and a rack and pinion mechanism for producing such movement, of automatically operating means for rotating said pinion shaft in opposite directions, said means comprising two pair of meshing gears, a common shaft on which one gear of each pair is fixedly mounted, means for separately driving the other gear of each pair, and means for transmitting the power from said common shaft to said pinion shaft each pair of coöperating gears being of a different size to cause the pinion to revolve faster in one direction than in the other.

2. In a machine of the character described, the combination with a member adapted for reciprocatory movement, and a rack and pinion mechanism for producing such movement, of automatically operating means for rotating said pinion shaft in opposite directions, said means comprising two pairs of meshing gears, a common shaft on which one gear of each pair is mounted, means for delivering power from said common shaft to said pinion shaft, a shaft upon which the other gear of one pair is mounted, a sleeve upon which the other gear of the second pair is mounted, a driving member common to said shaft and sleeve, a trip rod operatively connected with said driving member, trip arms adjustably mounted on said rod, and a tripper on said reciprocating member with its end operatively positioned between said trip arms.

3. In a machine of the character described, the combination with a member adapted for reciprocatory movement, and a rack and pinion mechanism for producing such movement, of automatically operating means for rotating said pinion shaft in opposite directions, said means comprising a worm wheel secured to said pinion shaft, a worm pinion in mesh with said wheel, a shaft therefor, two pairs of meshing gears, one gear of each pair mounted on said worm pinion shaft, means for separately driving the other gear of each pair including a pair of pulleys, one for each gear, a driving belt for said pulleys, a shipper engaging said belt and adapted to shift it from one pulley to the other, a shipper rod operatively connected with said shipper, a bell crank lever connected with said shipper rod, a trip rod connected with said bell crank lever, trip arms on said rod, and a tripper on said reciprocating part operatively positioned with respect to said arms.

ERIC A. LINDQUIST.

Witnesses:
Eugene H. Mead,
R. B. Flickinger.

Copies of this patent may be obtained for five cents each, by addressing the "Commissioner of Patents, Washington, D. C."